United States Patent Office 3,526,628
Patented Sept. 1, 1970

3,526,628
PROCESS FOR THE PRODUCTION OF 5,6-DIHYDROCYTOSINE COMPOUNDS
Leonard Doub, Bloomfield Hills, and Uldis Krolls, Ann Arbor, Mich., assignors to Parke, Davis & Company, Detroit, Mich., a corporation of Michigan
No Drawing. Continuation-in-part of application Ser. No. 476,694, Aug. 2, 1965. This application Mar. 4, 1968, Ser. No. 709,963
Int. Cl. C07d 51/28
U.S. Cl. 260—256.4        10 Claims

ABSTRACT OF THE DISCLOSURE

Process for the production of 5,6-dihydrocytosine compounds, substituted in the 1-position by lower alkyl or benzyl, and optionally substituted in the 5-position by chlorine, and salts thereof, by the cyclization of a 1-(2-cyanoethyl)urea compound. The 5,6-dihydrocytosine products are useful as chemical intermediates in the preparation of correspondingly 1-substituted cytosines.

CROSS-REFERENCE TO RELATED APPLICATION

This application is a continuation-in-part of co-pending application Ser. No. 476,694, filed Aug. 2, 1965, now U.S. Pat. 3,375,247.

SUMMARY AND DETAILED DESCRIPTION

The present invention relates to a process for the production of 5,6-dihydrocytosine compounds. More particularly, the invention relates to a process for the production of 5,6-dihydrocytosine compounds having the formula

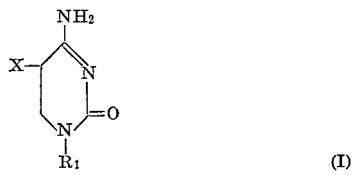

(I)

and salts thereof by the cyclization of a 1-(2-cyanoethyl)urea compound having the formula

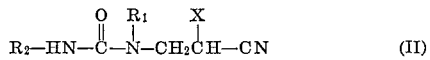

(II)

where $R_1$ is lower alkyl or benzyl, $R_2$ is hydrogen or an acyl group, and X is hydrogen or chlorine. The precise nature of the acyl group is not critical because during the cyclization process the acyl group is removed. It can be alkanoyl group or an aroyl group that may, if desired, contain one or more substituents. The preferred acyl group is benzoyl.

In accordance with the invention the cyclization process is carried out by reacting a 1-(2-cyanoethyl)urea compound having Formula II above with an acid or a base in an anhydrous unreactive solvent medium. When X in Formula II is hydrogen, either an acid or a base can be used to effect cyclization. When X in Formula II is chlorine, an acid is preferred because it has been found that reaction with a base gives unsatisfactory results. Preferred acids for this purpose are anhydrous hydrohalic acids, such as hydrogen chloride and hydrogen bromide. With these acids, the preferred solvent is anhydrous acetonitrile. Hydroxylic solvents and ethereal solvents should be avoided. For best results the reaction with acid is carried out between about 0 and 40° C., and a moderate to large excess of acid is used. Bases that may be used in the cyclization reaction include alkali metal alkoxides, alkali metal hydroxides, and alkali metal hydrides. The preferred base is an alkali metal alkoxide, such as sodium methoxide or ethoxide. The preferred solvents for use with the preferred base are the lower alkanoles methanol and ethanol. Other solvents that may be used includes acetonitrile, tetrahydrofuran, and 1,2-dimethoxyethane. As in the cyclization with acid, care must be taken to exclude water from the reaction mixture. The amount of base employed may vary widely. In the usual case, an amount approximately equivalent to the amount of the 1-(2-cyanoethyl)urea starting material is used, although a little as one-eighth equivalent can successfully be employed also. The temperature of the reaction with base may vary from room temperature to about 110° C. It is most convenient to carry out the reaction at the reflux temperature of the reaction mixture, and at that temperature it is normally complete after a period that may vary from 10–15 minutes to 1–2 hours.

When the cyclization reaction is carried out using an acid, the 5,6-dihydrocytosine product is obtained in acid-addition salt form and may be isolated as such, or may be converted to the free base by adjustment of the pH as required. When a base is used for cylization, the product is obtained directly as the free base, which can, if desired, be converted to an acid-addition salt by reaction with an acid.

The 1-(2-cyanoethyl)urea compounds required as starting materials in the foregoing process are prepared in a number of ways. The method of preparation of the 1-(2-cyanoethyl)urea compounds of Formula II wherein X is hydrogen is described in our co-pending application Ser. No. 476,694, filed Aug. 2, 1965, now U.S. Pat. 3,375,247. The 1-(2-chloro-2-cyanoethyl)urea compounds, that is, the compounds of Formula II wherein X is chlorine, are prepared by reacting 2-chloroacrylonitrile with an amine compound having the formula

$R_1$—$NH_2$        (III)

to give a 3-amino-2-chloropropionitrile compound having the formula

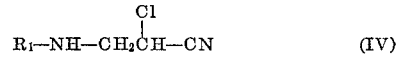

(IV)

which, in acid-addition salt form, is reacted with cyanic acid (conveniently generated in situ from an alkali metal cyanate) or with benzoyl isocyanate to give the desired 1-(2-chloro-2-cyanoethyl)urea starting material, having the formula,

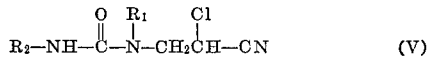

(V)

where $R_1$ and $R_2$ are as previously defined.

The 5,6-dihydrocytosine compounds produced by the process of the invention are useful as chemical intermediates. The compounds of Formula I wherein X is hydrogen can be reacted with a brominating or iodinating agent to give a corresponding 5-bromo- or 5-iodo-5,6-dihydrocytosine compound, which can be dehydrohalogenated by reaction with a base or by heating, to give a cytosine compound having the formula

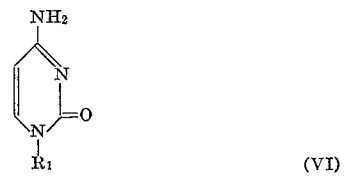

(VI)

where $R_1$ is as previously defined. The 5-chloro-5,6-dihydrocytosine products of the process of the invention can be similarly dehydrohalogenated to give a cytosine compound having the foregoing Formula VI. These reactions are more fully described in our application filed concurrently herewith, entitled "Process for the Production of Cytosine Compounds," Ser. No. 709,964, filed Mar. 4, 1968. The cytosine compounds of Formula VI can then be reacted with an acylated sulfanilyl chloride, such as N-acetylfulfanilyl chloride, to produce an acylated N-sulfanilylcytosine compound, which in turn can be hydrolyzed to produce an N-sulfanilylcytosine compound having the formula

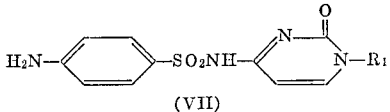

(VII)

where $R_1$ is as defined previously; as more fully described in the aforementioned co-pending application Ser. No. 476,694.

The invention is illustrated by the following examples.

Example 1

An ethanolic solution of sodium ethoxide (prepared by dissolving 13.45 g. of sodium in 780 ml. of absolute ethanol) is added to 659.8 g. of 1-(2-cyanoethyl)-1-ethylurea, and the resulting mixture is heated under reflux for 20–25 minutes, cooled, and filtered to give 1-ethyl-5,6-dihydrocytosine. The solid product is washed with a small amount of cold ethanol and with ether, and then dried; M.P. 188–190.5° C. (with decomposition).

Example 2

To a methanolic solution of sodium methoxide (prepared by dissolving 11.5 g. of sodium in 500 ml. of methanol) is added 58.7 g. of 1-(2-cyanoethyl)-1-ethylurea, and the resulting solution is heated under reflux for 30 minutes. Upon cooling, the solid that precipitates is isolated, washed with a small amount of cold methanol and with ether, and dried. It is 1-ethyl-5,6-dihydrocytosine, identical to that obtained as described in Example 1 above.

Utilizing the foregoing procedure, the following 1-lower alkyl-5,6-dihydrocytosines can be obtained from the reaction of the designated 1-(2-cyanoethyl)-1-(lower alkyl)-urea compound with sodium methoxide:

(1) 1-methyl-5,6-dihydrocytosine; from 1-(2-cyanoethyl)-1-methylurea.
(2) 1-butyl-5,6-dihydrocytosine; from 1-(2-cyanoethyl)-1-butylurea.

Example 3

To a solution prepared by bubbling 15.06 g. of anhydrous hydrogen chloride into 100 ml. of acetonitrile, cooled to −30° C., is added 1.76 g. of 1-(2-cyanoethyl)-1-ethylurea and the mixture is shaken and kept at room temperature for 26 hours. The resulting solution is then evaporated to dryness at room temperature under reduced pressure, and the solid residue of 1-ethyl-5,6-dihydrocytosine hydrochloride is isolated, washed with 10 ml. of acetonitrile and with 10 ml. of ether, and dried; M.P. 194–196° C.

Example 4

To a stirred methanolic solution of sodium methoxide (prepared by dissolving 9.38 g. of sodium in 250 ml. of absolute methanol) is added 81.3 g. of 1-(2-cyanoethyl)-1-benzylurea, and the resulting solution is stirred and heated under reflux for 7 minutes. Upon cooling, the solid that precipitates is isolated, washed with cold methanol and with ether, and dried. It is 1-benzyl-5,6-dihydrocytosine; M.P. 246–247.5° C.

Example 5

Dry hydrogen chloride (4.5 g.) is bubbled into 20 ml. of dry acetonitrile, cooled to 0° C., and to the cold solution is added 3.51 g. of 1-(2-chloro-2-cyanoethyl)-1-ethylurea. After thorough mixing, the resulting solution is allowed to warm to 30° C., kept at room temperature for 2 days, and then cooled to 0° C. and filtered. The solid 5-chloro-1-ethyl-5,6-dihydrocytosine hydrochloride obtained is washed with two 5-ml. portions of cold dry acetonitrile and with several small portions of ether, and dried under reduced pressure over potassium hydroxide; M.P. 210° C. (with decomposition).

The hydrochloride salt (2.0 g.) is stirred well with a solution of 2 ml. of triethylamine in 20 ml. of absolute methanol, and the resulting mixture is filtered. The solid 5-chloro-1-ethyl-5,6-dihydrocytosine free base that is isolated on the filter is washed successively with 15 ml. of water, a small amount of cold ethanol, and a small amount of ether, and dried; M.P. 180–184° C. (with decomposition), following crystallization from absolute ethanol.

The 1-(2-chloro-2-cyanoethyl)-1-ethylurea starting material is prepared as follows.

To a stirred solution of 6.38 ml. of ethylamine in 50 ml. of acetonitrile, cooled to −20° C., is added 8.04 ml. of α-chloroacrylonitrile while the temperature of the reaction mixture is maintained below 10° C. The mixture is then cooled to 0° C., made slightly acid (pH 6) by the addition of 46.5 ml. of 2 N aqueous hydrochloric acid, and the acidic solution is evaporated to dryness. The solid residue obtained, which is 2-chloro-3-ethylaminopropionitrile hydrochloride, is purified by successive crystallization from absolute ethanol and from acetonitrile (with charcoal treatment); M.P. 158–159° C.

To a stirred solution of 16.9 g. of 2-chloro-3-ethylaminopropionitrile hydrochloride in 30 ml. of water, cooled in an ice-water bath, is first added about 1 g. of Dry Ice and then 8.27 g. of potassium cyanate. The resulting mixture is stirred briefly until a clear solution is obtained, the cooling bath is then removed, and the reaction mixture is allowed to warm to 15° C. with continued stirring. The mixture is kept at 12–15° C. for one hour more, and is then stored at 0° C. overnight. The solid that precipitates during this period is isolated, washed with two 5-ml. portions of ice-cold water and dried under reduced pressure over phosphorus pentoxide. It is the desired 1-(2-chloro-2-cyanoethyl)-1-ethylurea, which may be purified by crystallization from cold aqueous acetone; M.P. 90–90.6° C. Heating during crystallization should be avoided since the compound is unstable above room temperature. It is likewise unstable upon extended storage at room temperature, and should be reacted further without undue delay.

Example 6

A solution is prepared by bubbling 19.5 g. of anhydrous hydrogen chloride into 129 ml. of dry acetonitrile, cooled to 0° C., and to the cold solution is added 35.5 g. of 1-(2-chloro-2-cyanoethyl)-1-ethyl-3-benzoylurea. After thorough mixing, the cooling bath is removed, and the reaction mixture is kept at room temperature for 2–3 days (there is an initial temperature rise to 39° C.), cooled again to 0° C., and filtered to give 5-chloro-1-ethyl-5,6-dihydrocytosine hydrochloride, which is washed with three 20-ml. portions of cold acetonitrile and with two 20-ml. portions of ether, and dried under reduced pressure over potassium hydroxide.

The 1 - (2-chloro-2-cyanoethyl)-1-ethyl-3-benzoylurea starting material is prepared as follows.

To a stirred solution of 12.76 ml. of ethylamine in 100 ml. of dry acetonitrile, cooled to −30° C., is added 16.1 ml. of cold (0° C.) α-chloroacrylonitrile while the temperature of the reaction mixture is maintained below 0° C. The resulting mixture is then cooled to −25° C., 25.5 ml. of benzoylisocyanate is added, the cooling bath is removed, and the reaction mixture is allowed to warm to 15° C. over a 10 minute period. It is then cooled to 0° C. again, and the solid 1-(2-chloro-2-cyanoethyl)-1-ethyl-3-benzoylurea that precipitates (seeding with crystals obtained in small test tube trials and scratching may be required) is isolated, washed with cold acetonitrile and petroleum ether, and dried; M.P. 122–123° C., following crystallization from absolute ethanol (with charcoal treatment).

We claim:

1. Process for the production of a member of the class consisting of 5,6-dihydrocytosine compounds having the formula

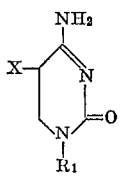

and salts thereof, which comprises the cyclization of a 1-(2-cyanoethyl)urea compound having the formula

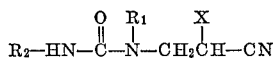

where $R_1$ is a member of the class consisting of lower alkyl and benzyl, $R_2$ is a member of the class consisting of hydrogen and an acyl group, and X is a member of the class consisting of hydrogen and chlorine.

2. Process according to claim 1 wherein a 1-(2-cyanoethyl)urea compound having the formula

is cyclized by reaction with an alkali metal alkoxide in an anhydrous unreactive solvent medium; where $R_1$ is defined as in claim 1.

3. Process according to claim 2 wherein the alkali metal alkoxide is a sodium alkoxide and the solvent medium is a lower alkanol.

4. Process according to claim 2 wherein 1-(2-cyanoethyl)-1-ethylurea is cyclized by reaction with a sodium alkoxide in a lower alkanol solvent medium to produce 1-ethyl-5,6-dihydrocytosine.

5. Process according to claim 1 wherein a 1-(2-cyanoethyl)urea compound having the formula

is cyclized by reaction with an acid in an anhydrous unreactive solvent medium; where $R_1$ is defined as in claim 1.

6. Process according to claim 5 wherein 1-(2-cyanoethyl)-1-ethylurea is cyclized by reaction with anhydrous hydrogen chloride in anhydrous acetonitrile to produce 1-ethyl-5,6-dihydrocytosine hydrochloride.

7. Process according to claim 1 wherein a 1-(2-cyanoethyl)urea compound having the formula

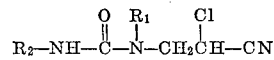

is cyclized by reaction with an acid in an anhydrous unreactive solvent medium; where each of $R_1$ and $R_2$ is defined as in claim 1.

8. Process according to claim 7 wherein 1-(2-chloro-2-cyanoethyl)-1-ethylurea is cyclized by reaction with anhydrous hydrogen chloride in anhydrous acetonitrile to produce 5-chloro-1-ethyl-5,6-dihydrocytosine hydrochloride.

9. Process according to claim 8 wherein the 5-chloro-1-ethyl-5,6-dihydrocytosine hydrochloride product is converted to 5-chloro-1-ethyl-5,6-dihydrocytosine free base by reaction with a base.

10. Process according to claim 7 wherein 1-(2-chloro-2-cyanoethyl)-1-ethyl-3-benzoylurea is cyclized by reaction with anhydrous hydrogen chloride in anhydrous acetonitrile to produce 5-chloro-1-ethyl-5,6-dihydrocytosine hydrochloride.

References Cited

Cheng et al., J. Heterocyclic Chem., 1(5), 260–2 (1964).

ALEX MAZEL, Primary Examiner

R. J. GALLAGHER, Assistant Examiner

U.S. Cl. X.R.
260—239.75, 465.4